(12) United States Patent
Arce

(10) Patent No.: US 11,067,057 B2
(45) Date of Patent: Jul. 20, 2021

(54) SPLITTER PLATE ARRANGEMENT FOR A SERRATED WIND TURBINE BLADE

(71) Applicant: LM WP PATENT HOLDING A/S, Kolding (DK)

(72) Inventor: Carlos Arce, Diemen (NL)

(73) Assignee: LM WP PATENT HOLDING A/S, Kolding (DK)

( * ) Notice: Subject to any disclaimer, the term of this patent is extended or adjusted under 35 U.S.C. 154(b) by 359 days.

(21) Appl. No.: 16/062,342

(22) PCT Filed: Dec. 16, 2016

(86) PCT No.: PCT/EP2016/081558
§ 371 (c)(1),
(2) Date: Jun. 14, 2018

(87) PCT Pub. No.: WO2017/103192
PCT Pub. Date: Jun. 22, 2017

(65) Prior Publication Data
US 2020/0277931 A1    Sep. 3, 2020

(30) Foreign Application Priority Data
Dec. 17, 2015  (EP) ..................................... 15200683

(51) Int. Cl.
*F03D 1/06*   (2006.01)

(52) U.S. Cl.
CPC ......... *F03D 1/0675* (2013.01); *F03D 1/0641* (2013.01); *F05B 2240/30* (2013.01);
(Continued)

(58) Field of Classification Search
CPC .......... F05B 2260/96; F05B 2280/6003; F05B 2240/30; F05B 2250/183; F03D 1/0675; F03D 1/0641; B29L 2031/085
See application file for complete search history.

(56) References Cited

U.S. PATENT DOCUMENTS

| 175,355 | A | * | 3/1876 | King | .......................... | F03D 3/00 |
| | | | | | | 416/118 |
| 573,562 | A | * | 12/1896 | Wittram | ........................ | 416/235 |

(Continued)

FOREIGN PATENT DOCUMENTS

| GB | 2497739 A | 6/2013 |
| WO | 2013/045601 A1 | 4/2013 |

(Continued)

OTHER PUBLICATIONS

Extended European Search Report dated May 27, 2016 in corresponding European Patent Application No. EP 15200683.9.

*Primary Examiner* — Kenneth Bomberg
*Assistant Examiner* — Brian Christopher Delrue
(74) *Attorney, Agent, or Firm* — Nath, Goldberg & Meyer; Jerald L. Meyer; Tanya E. Harkins

(57) ABSTRACT

A wind turbine blade (10) is described having a serrated trailing edge (20). Splitter plates (106) are provided on the blade, to reduce operational noise. Each splitter plate (106) is arranged to extend at least partly into a space in between adjacent serrations. The splitter plates can be formed integrally with the serrations, or attached to existing serrations as a retrofit solution. The serrations with the splitter plates can be provided as a trailing edge panel (108) for attachment to the trailing edge of an existing wind turbine blade.

26 Claims, 5 Drawing Sheets

(52) U.S. Cl.
CPC ..... *F05B 2250/183* (2013.01); *F05B 2260/96* (2013.01); *F05B 2280/6003* (2013.01)

(56) References Cited

U.S. PATENT DOCUMENTS

| | | | | |
|---|---|---|---|---|
| 1,861,065 A * | 5/1932 | Poot | ................ | B64C 11/16 416/235 |
| RE19,412 E * | 1/1935 | Zaparaka | ................ | B64C 9/00 244/215 |
| 2,071,012 A * | 2/1937 | Adams | ................ | B64C 11/00 244/1 R |
| 2,238,749 A * | 4/1941 | Peltier | ................ | F04D 29/384 416/203 |
| D131,271 S * | 2/1942 | Collura | ................ | D23/413 |
| 2,616,509 A * | 11/1952 | Thomas | ................ | B64C 3/30 416/84 |
| 4,089,618 A * | 5/1978 | Patel | ................ | F04D 29/668 416/228 |
| 4,618,313 A * | 10/1986 | Mosiewicz | ................ | B64C 11/18 416/23 |
| 5,088,665 A * | 2/1992 | Vijgen | ................ | B64C 23/06 244/198 |
| 5,320,491 A * | 6/1994 | Coleman | ................ | F03D 7/0252 244/213 |
| 5,522,266 A * | 6/1996 | Nicholson | ................ | G01L 9/0055 73/708 |
| 5,533,865 A * | 7/1996 | Dassen | ................ | F03D 1/0608 416/228 |
| 5,819,357 A * | 10/1998 | Gould | ................ | A46B 13/005 15/182 |
| 6,491,260 B2 * | 12/2002 | Borchers | ................ | B64C 21/10 244/199.1 |
| 6,733,240 B2 * | 5/2004 | Gliebe | ................ | F01D 5/141 416/228 |
| 6,779,978 B2 * | 8/2004 | Camargo Do Amarante | ................ | F04D 29/384 416/228 |
| 7,059,833 B2 * | 6/2006 | Stiesdal | ................ | F03D 1/0641 416/41 |
| 7,351,041 B2 * | 4/2008 | Uselton | ................ | F04D 29/384 415/119 |
| 7,413,408 B1 * | 8/2008 | Tafoya | ................ | B64C 21/10 416/228 |
| 7,632,068 B2 * | 12/2009 | Bak | ................ | F03D 1/0641 416/23 |
| 7,976,283 B2 * | 7/2011 | Huck | ................ | F03D 1/0633 415/119 |
| 8,414,261 B2 * | 4/2013 | Bonnet | ................ | F03D 1/0641 415/119 |
| 9,341,158 B2 * | 5/2016 | Smith | ................ | F03D 1/0633 |
| 9,458,821 B2 * | 10/2016 | Jacobsen | ................ | F03D 1/0675 |
| 9,494,134 B2 * | 11/2016 | Kinzie | ................ | F03D 1/0675 |
| 9,581,133 B2 * | 2/2017 | Yao | ................ | F03D 1/0608 |
| 9,605,649 B2 * | 3/2017 | Mehdi | ................ | F03D 1/065 |
| 9,638,164 B2 * | 5/2017 | Vedula | ................ | F03D 1/0633 |
| 9,849,976 B2 * | 12/2017 | Piechowicz | ................ | B64C 27/467 |
| 10,011,346 B2 * | 7/2018 | Beckman | ................ | B64C 27/463 |
| 10,099,773 B2 * | 10/2018 | Beckman | ................ | B64C 11/18 |
| 10,227,963 B2 * | 3/2019 | Van Garrel | ................ | F03D 1/0675 |
| 10,240,576 B2 * | 3/2019 | Drack | ................ | F03D 1/0641 |
| 10,259,562 B2 * | 4/2019 | Beckman | ................ | B64C 11/18 |
| 10,259,574 B2 * | 4/2019 | Beckman | ................ | B64C 39/024 |
| 10,286,996 B2 * | 5/2019 | Lacy | ................ | B64C 21/10 |
| 10,301,942 B2 * | 5/2019 | Joseph | ................ | F01D 5/141 |
| 10,400,744 B2 * | 9/2019 | Herrig | ................ | F03D 1/0641 |
| 10,421,533 B2 * | 9/2019 | Domel | ................ | B64C 23/06 |
| 10,460,717 B2 * | 10/2019 | Beckman | ................ | B64C 27/46 |
| 10,465,652 B2 * | 11/2019 | Wetzel | ................ | F03D 1/0675 |
| 10,690,110 B2 * | 6/2020 | Church | ................ | F03D 1/0608 |
| 2003/0175121 A1 * | 9/2003 | Shibata | ................ | F03D 1/0641 416/131 |
| 2004/0253114 A1 * | 12/2004 | Gunneskov | ................ | F03D 1/0675 416/224 |
| 2007/0025858 A1 * | 2/2007 | Driver | ................ | F03D 1/065 416/229 R |
| 2007/0041823 A1 * | 2/2007 | Miller | ................ | F03B 17/061 415/4.1 |
| 2007/0065290 A1 * | 3/2007 | Herr | ................ | F03D 1/0633 416/223 R |
| 2007/0077150 A1 * | 4/2007 | Llorente Gonzalez | ................ | F03D 1/0608 416/223 R |
| 2008/0080977 A1 * | 4/2008 | Bonnet | ................ | F03D 3/061 416/229 A |
| 2008/0107540 A1 * | 5/2008 | Bonnet | ................ | F03D 1/0675 416/229 R |
| 2008/0166241 A1 * | 7/2008 | Herr | ................ | F04D 29/38 416/241 R |
| 2008/0187442 A1 * | 8/2008 | Standish | ................ | F03D 13/10 416/235 |
| 2008/0298967 A1 * | 12/2008 | Matesanz Gil | ................ | F03D 1/0608 416/146 R |
| 2009/0016891 A1 * | 1/2009 | Parsania | ................ | F03D 1/0675 416/223 R |
| 2009/0074585 A1 * | 3/2009 | Koegler | ................ | F03D 1/0675 416/228 |
| 2009/0104038 A1 * | 4/2009 | Grabau | ................ | F03D 1/0641 416/219 R |
| 2010/0104436 A1 * | 4/2010 | Herr | ................ | F03D 1/06 416/31 |
| 2010/0260614 A1 * | 10/2010 | Fuglsang | ................ | F03D 1/0675 416/241 R |
| 2010/0329879 A1 * | 12/2010 | Presz, Jr. | ................ | F03D 1/0675 416/228 |
| 2011/0018282 A1 * | 1/2011 | Hayashi | ................ | F03D 9/25 290/55 |
| 2011/0142637 A1 * | 6/2011 | Riddell | ................ | F03D 1/0633 416/62 |
| 2011/0223030 A1 * | 9/2011 | Huck | ................ | F03D 1/0675 416/228 |
| 2012/0027590 A1 * | 2/2012 | Bonnet | ................ | F03D 1/0641 416/1 |
| 2012/0057984 A1 * | 3/2012 | Fuglsang | ................ | F03D 1/0675 416/234 |
| 2014/0286784 A1 * | 9/2014 | Singh | ................ | F03D 1/0683 416/228 |

FOREIGN PATENT DOCUMENTS

WO            2014/048437 A1        4/2014
WO    WO-2014048437 A1 *   4/2014    ........... F03D 1/0675

* cited by examiner

US 11,067,057 B2

SPLITTER PLATE ARRANGEMENT FOR A SERRATED WIND TURBINE BLADE

This is a National Phase Application filed under 35 U.S.C. 371 as a national stage of PCT/EP2016/081558, filed Dec. 16, 2016, an application claiming the benefit of European Application No. 15200683.9, filed Dec. 17, 2015, the content of each of which is hereby incorporated by reference in its entirety.

FIELD OF THE INVENTION

The present invention relates to a splitter plate arrangement for a wind turbine blade having trailing edge serrations.

BACKGROUND OF THE INVENTION

Wind power is increasingly popular due to its clean and environmentally friendly production of energy. The rotor blades of modern wind turbines capture kinetic wind energy by using sophisticated blade design created to maximise efficiency. However, complaints have arisen about the creation of noise associated with the operation of wind power plants. Hence, noise reducing devices and associated blade designs are increasingly desired.

To this end, modern wind turbine blades are sometimes provided with serrations along the blade trailing edges, in an effort to reduce blade trailing edge noise and/or to improve wind turbine blade efficiency, as can be seen in EP1314885. While the noise mitigating properties of such serrations are advantageous, several drawbacks remain. Often, finding the right serration geometry is a trade-off between noise mitigation performance and structural requirements. This may lead to the need for thick trailing edge regions, especially near the serration base. This increased thickness has been found by the present inventions to become a potential source of additional noise.

With reference to FIG. 5, an enlarged view of a set of prior art serrations is indicated at 100, the serrations 100 comprising a base end 102 arranged at the trailing edge of a wind turbine blade and an apex or tip end 104. As mentioned above, it has been found by the present inventors that such serration design in some case is a source of operational noise in itself. It would therefore be desirable to optimise prior art serration designs such that enhanced noise reduction is achieved.

US 2012/027590 A1 discloses a wind turbine blade provided with noise reducer features that are arranged on the surface of the wind turbine blade such that they form serrations. Some embodiments include first noise reduction features and second noise reduction features. US 2012/027590 A1 does not disclose any particular shape, orientation or dimensions of these particular features.

It is therefore an object of the invention to provide a wind turbine blade having an improved trailing edge configuration.

It is another object of the invention to provide a wind turbine blade design having serrations, which design provides improved noise reduction during operation.

In particular, it is an object of the present invention to mitigate noise caused by serrations arranged on a wind turbine blade.

SUMMARY OF THE INVENTION

Accordingly, there is provided a wind turbine blade having a profiled contour including a pressure side and a suction side, and a leading edge and a trailing edge with a chord having a chord length extending therebetween, the wind turbine blade extending in a spanwise between a root end and a tip end, the wind turbine blade comprising a plurality of serrations provided along at least a portion of the trailing edge of the blade, wherein the wind turbine blade further comprises one or more splitter plates, each splitter plate being arranged to extend at least partly into a space in between adjacent serrations.

It has been surprisingly found that fitting the relatively thick serration base region with at least one splitter plate is a simple and efficient solution to mitigate the formation and interaction of periodic coherent turbulent structures. These are usually shed from a sufficiently thick trailing edge and may become the source of additional noise. Preferably, the splitter plate is comparatively thin, having a thickness of 2.0 mm or less, more preferably 1.5 mm or less, most preferably 1.0 mm or less.

Preferably, the splitter plate has a thickness that is less than the thickness of at least part of the adjacent serrations. It has also been found that the noise mitigating effect of the splitter plate arrangement allows for thicker base regions of the serrations. This results in increased design freedom for the serrations and associated material requirements. For instance, less stiff materials, offering edgewise elasticity, which is desired, could be used for the serrations with increased thicknesses, compensating for flexibility in that way. This may reduce material costs in that less costly materials can be used. Also, it increases the robustness of the device, lowering potential maintenance costs, while still maintaining the noise mitigation properties of the arrangement.

According to one advantageous embodiment, the one or more splitter plates are arranged between, and preferably connected to, adjacent serrations. The splitter plates may for instance be connected between a first sidewall of a first serration and a second sidewall of a second serration.

In another advantageous embodiment, sidewalls of the serrations have a sidewall thickness and a plate thickness of the splitter plate is less than the sidewall thickness. The ratio of the sidewall thickness and the plate thickness may for instance be at least 2:1, or at least 5:2, or at least 3:1.

The splitter plate may have a substantially uniform thickness.

Advantageously, the splitter plate should have a triangular, parallelogram or kite geometry, offering the same or similar principle of slanted trailing edge of regular serrations, for maintaining the noise mitigation properties of the arrangement. Preferably, it extends to no more than half the total length of the serration teeth. The splitter plate may be as thin as possible, as it is bound by the same structural requirements as the serrations.

In a preferred embodiment, the splitter plate comprises a vertex, preferably an acute angle vertex, extending into said space in between adjacent serrations. It has been found that such arrangement results in particularly efficient noise mitigation. Advantageously, the acute angle could be substantially identical to the acute angle at the apex of the respective serrations.

According to another embodiment, the serrations and the splitter plates define respective planes which are oriented substantially parallel to each other. This means planes, which are either parallel or arranged at an angle of not more than 15°, preferably not more than 10°, to each other. In case of serrations tapering towards their apex end, the plane of the splitter plates is preferably oriented at an angle to the top surface and to the bottom surface of the serrations, i.e. the respective suction and pressure sides of the serrations, such that the angle between the plane defined by the serration top surface and the plane of the splitter plate equals the angle between the plane defined by the serration bottom surface and the plane of the splitter plate.

According to another embodiment, the serrations comprise a base proximal to the trailing edge of the blade and an apex distal to the trailing edge of the blade with a notional line extending from a midpoint of the base to the apex defining a height H of the serration and wherein the at least one splitter plate extends into a space in between adjacent serrations to a distance of 60% or less, preferably 50% or less, of the height H of said trailing edge serrations. It has been found by the present inventors that the splitter plates advantageously have a length sufficient to disrupt the formation of periodic coherent turbulent structures, i.e. more than a wavelength of such structures. The above mentioned distances have been found to meet this requirement. Preferably, one or more splitter plates extend into a space in between adjacent serrations to a distance of 50% or less, such as 40% or less, or 30% or less, of the height H of said serrations.

According to a preferred embodiment, said serrations are arranged at incidence to the flow over the wind turbine blade, i.e. at an angle to the flow direction over the blade at the trailing edge of the blade. In one aspect, said serrations are angled towards the pressure side of the wind turbine blade. Preferably, said serrations are angled to the flow direction over the wind turbine blade at an angle of between 0-45 degrees to the flow direction, preferably between 1-25 degrees. This may advantageous increase the lift of the blade.

It is also preferred that the splitter plates are arranged at incidence to the flow over the wind turbine blade. In one aspect, the splitter plates are angled towards the pressure side of the wind turbine blade. Preferably, the splitter plates are angled to the flow direction over the wind turbine blade at an angle of between 0-45 degrees to the flow direction, preferably between 1-25 degrees.

According to one embodiment, said splitter plates are formed integrally with said serrations. This could be accomplished by integrally moulding the serrations and splitter plates.

According to another embodiment, said splitter plates are provided as add-on elements arranged to be attached to said serrations. In one embodiment, said splitter plates are attached to said serrations using adhesive bonding and/or a snap-fit or clip-on interlocking connection. In another embodiment, the serrations may contain one or more slits into which part of the splitter plates may be inserted for subsequent fastening.

Preferably, the thickness of the splitter plate is 2.0 mm or less, preferably 1.5 mm or less, such as 1.0 mm or less. It has been found that the splitter plates can be comparatively thin as compared to the serrations.

According to a preferred embodiment, the splitter plate comprises a parallelogram shaped surface, preferably two opposing parallelogram shaped surfaces. Even more preferred, the splitter plate comprises two opposing diamond shaped surfaces. Thus, both the top surface and the bottom surface of the splitter plate, as separated by a thickness of e.g. less than 2.0 mm, are shaped like a parallelogram or a diamond. This design has the advantage that it enables an easy and efficient attachment of the splitter plates in between adjacent serrations, while the desired noise mitigation is provided.

It is preferred that an acute angle of the diamond shaped surface extends into the space between adjacent serrations.

According to yet another embodiment, the splitter plate comprises a kite shaped surface, preferably two opposed kite shaped surfaces. According to an alternative embodiment, the splitter plate comprises a triangular shaped surface, preferably two opposing triangular shaped surfaces.

According to a preferred embodiment, the splitter plate has uniform thickness. In addition, the serrations may have a substantially uniform thickness. The serrations may e.g. be formed of a panel attached to the blade or sandwiched between a pressure side shell part and a suction side shell part. Alternatively, the serrations may comprise a top and a bottom surface tapering towards each other at their respective apex ends.

According to another embodiment, the splitter plate comprises one or more slits and/or holes, advantageously extending along the height of the serration, e.g. from the distal part of the splitter plate. This embodiment was found to reduce loads on the inventive arrangement, as increased by the added area as compared to prior art serrations. Advantageously, the slits of the splitter plate have a width of 0.2 mm to 2.0 mm.

According to another embodiment, the splitter plate comprises a comb-like structure. Preferably, the comb-like structure is a stiff structure. Preferably, the splitter plates are formed from a plastic material.

In another aspect, the present invention relates to a serrated panel for a wind turbine blade, wherein the panel is arranged to be attached to the trailing edge of a blade to form a plurality of serrations at the trailing edge of the blade,
wherein the panel further comprises one or more splitter plates, each splitter plate being arranged to extend at least partly into a space in between adjacent serrations.

In yet another aspect, the present invention relates to a wind turbine comprising at least one wind turbine blade of the present invention.

As used herein, the term "splitter plate" refers to a plate-shaped component to control aerodynamic flow in between and/or in the vicinity of the serrations. Usually, a splitter plate will have a uniform thickness throughout its entire length-width extension. In some embodiments the splitter plate may comprise a rigid plate.

As used herein, the term "diamond shaped" refers to a surface with the shape of a rhombus or rhomb, also known as equilateral parallelogram. Also, the term "kite shaped" refers to a surface with the shape of a quadrilateral whose four sides can be grouped into two pairs of equal-length sides that are adjacent to each other.

As used herein, planes which are oriented substantially parallel to each other means planes which are either parallel or arranged at an angle of not more than 15°, preferably not more than 10° to each other, most preferably not more than 5° to each other.

DETAILED DESCRIPTION OF THE INVENTION

Embodiments of the invention will now be described, by way of example only, with reference to the accompanying drawings, in which.

It will be understood that elements common to the different embodiments of the invention have been provided with the same reference numerals in the drawings.

Figure 1:
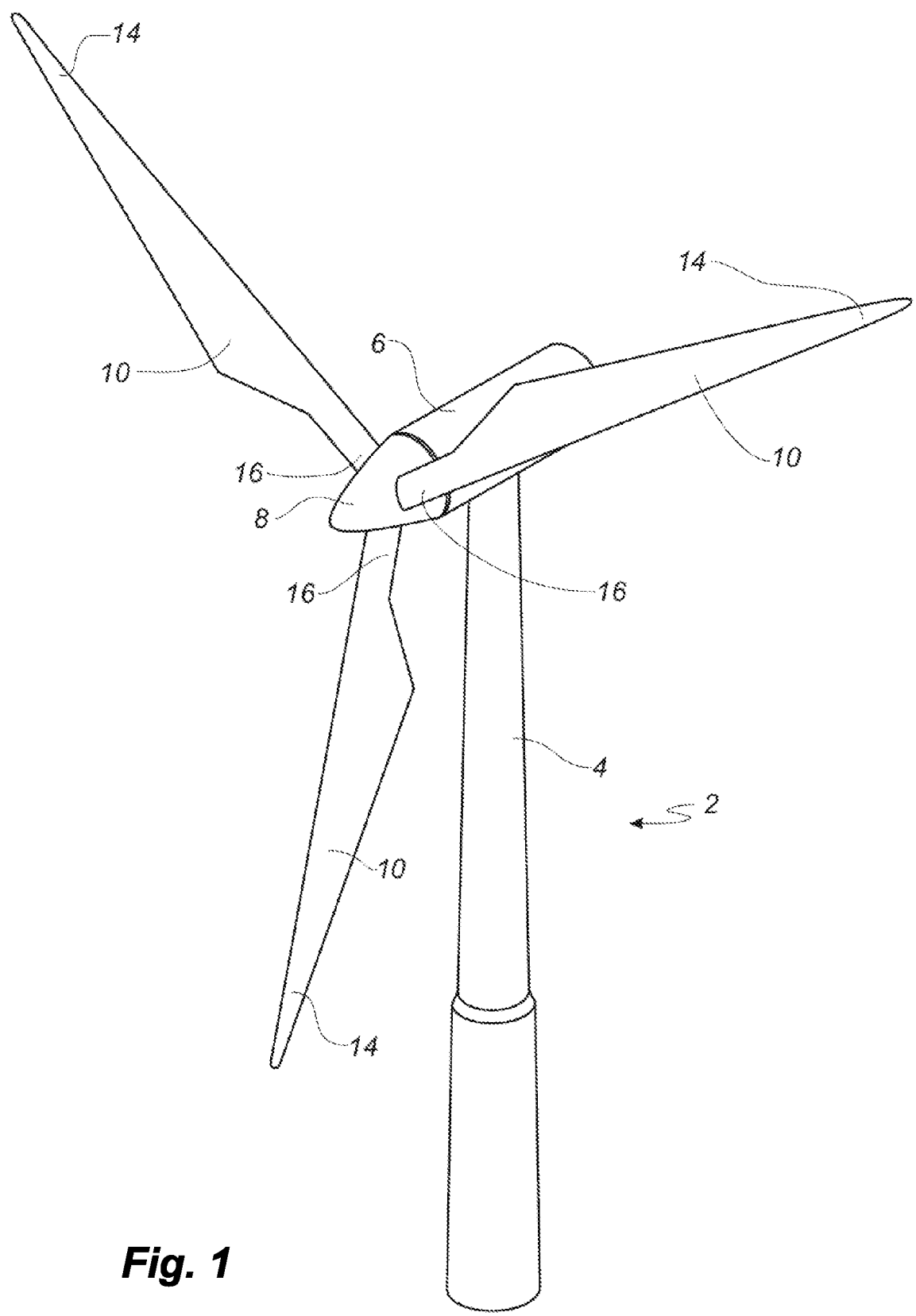
FIG. 1 shows a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8, the blade extending in a spanwise direction between the root 16 and the tip 14. The rotor has a radius denoted R.

Figure 2:
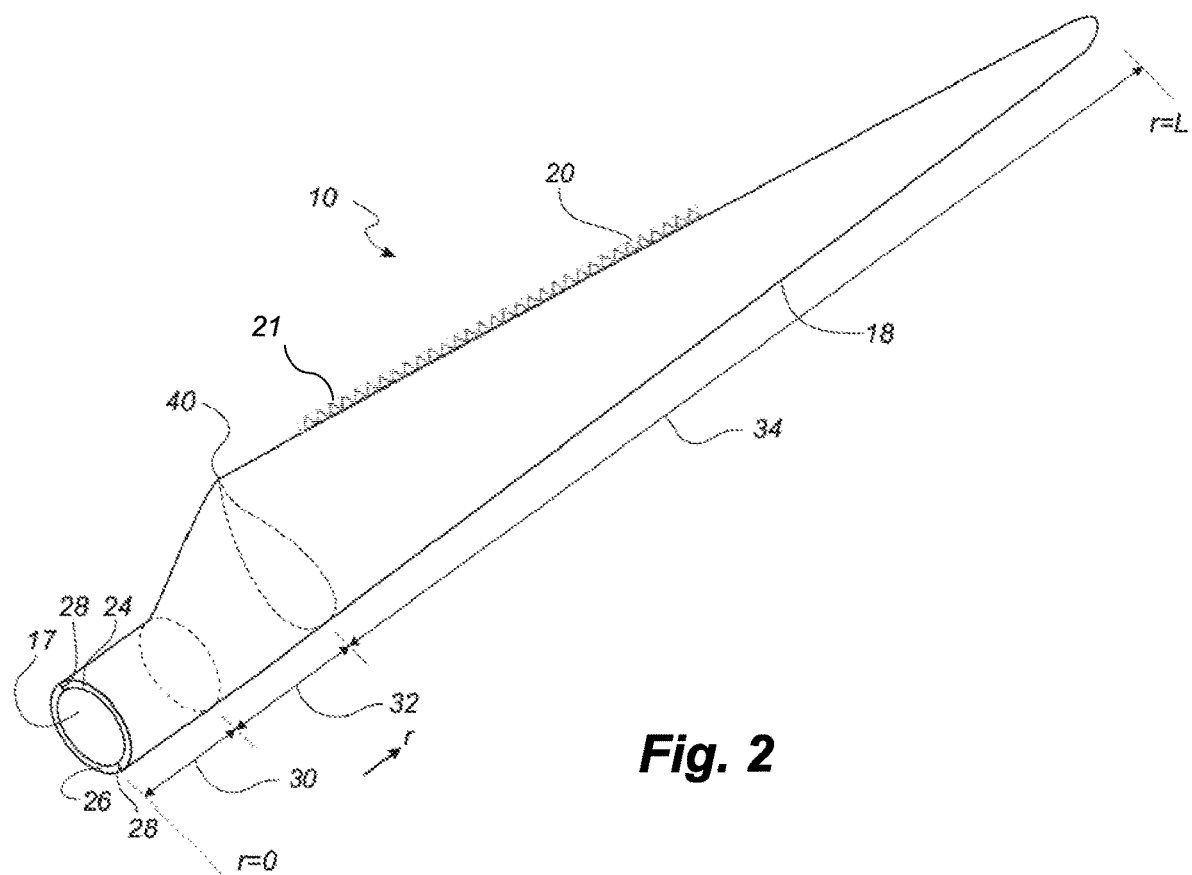
FIG. 2 shows a schematic view of a wind turbine blade according to the invention.

FIG. 2 shows a schematic view of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18. An array of trailing edge serrations 21 are provided along a portion of the trailing edge 20 of the blade. In general, flow of air over the wind turbine blade 10 extends from the leading edge 18 to the trailing edge 20 in a generally transverse or chordwise direction. While the serrations in FIG. 2 are depicted as being arranged along a middle portion of the blade, it is recognised that the serrations may be arranged for instance closer to the tip of the blade 10, or that they may be arranged along for instance the entire airfoil region 34 of the blade 10.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
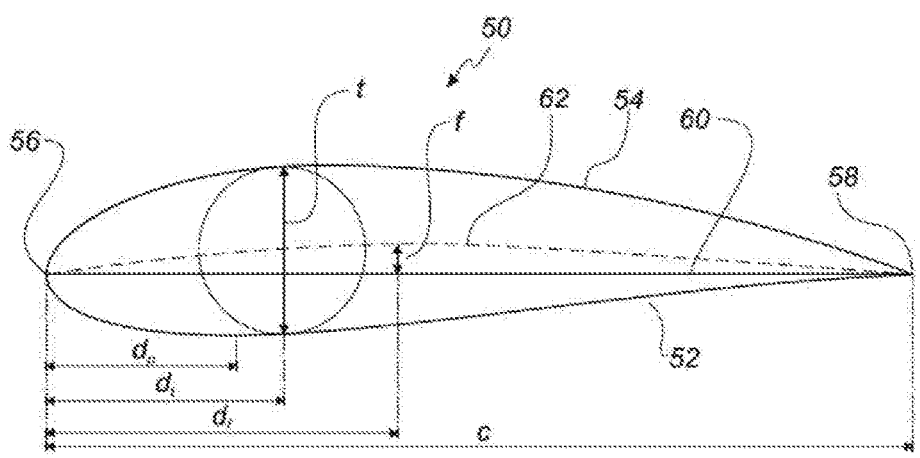
FIG. 3 shows a schematic view of an airfoil profile of the blade of FIG. 2.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

Figure 4:
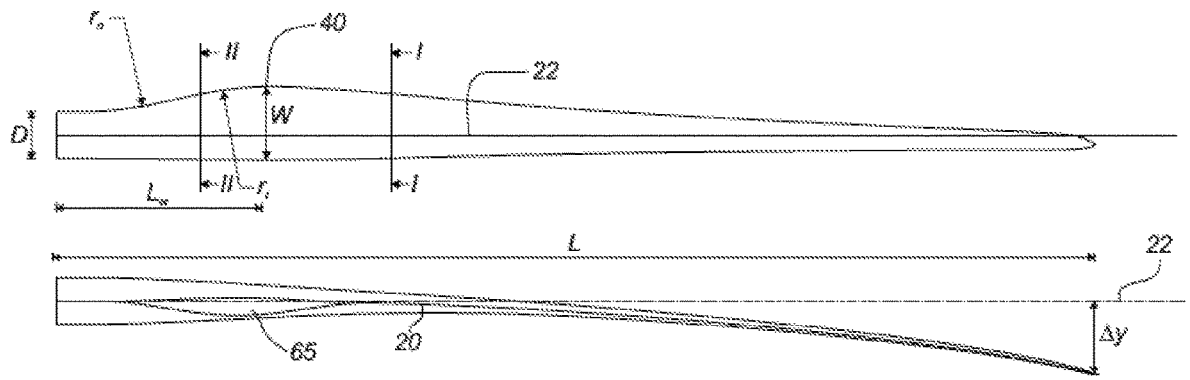
FIG. 4 shows a schematic view of the wind turbine blade of FIG. 2, seen from above and from the side.

FIG. 4 shows some other geometric parameters of the blade. The blade has a total blade length L. As shown in FIG. 2, the root end is located at position r=0, and the tip end located at r=L. The shoulder 40 of the blade is located at a position $r=L_w$, and has a shoulder width W, which equals the chord length at the shoulder 40. The diameter of the root is defined as D. Further, the blade is provided with a pre-bend, which is defined as Δy, which corresponds to the out of plane deflection from a pitch axis 22 of the blade.

The wind turbine blade 10 generally comprises a shell made of fibre-reinforced polymer, and is typically made as a pressure side or upwind shell part 24 and a suction side or downwind shell part 26 that are glued together along bond lines 28 extending along the trailing edge 20 and the leading edge 18 of the blade 10. Wind turbine blades are generally formed from fibre-reinforced plastics material, e.g. glass fibres and/or carbon fibres which are arranged in a mould and cured with a resin to form a solid structure. Modern wind turbine blades can often be in excess of 30 or 40 metres in length, having blade root diameters of several metres. Wind turbine blades are generally designed for relatively long lifetimes and to withstand considerable structural and dynamic loading.

Figure 5:
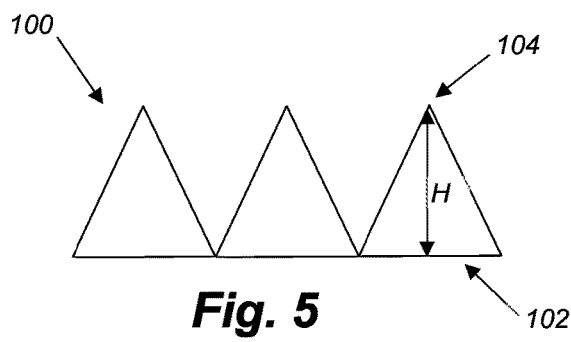
FIG. 5 illustrates a set of trailing edge serrations.

With reference to FIG. 5, an enlarged view of a plurality of prior art serrations 100 of the serrated trailing edge 21 are shown. The serrations 100 comprise a base end 102 which is arranged at the trailing edge 20 of the wind turbine blade 10, and a tip end 104 which extends downwind of the blade trailing edge 20. A notional line extending from a midpoint of the base 102 to the apex or tip end 104 defines a height H of the serration. The illustrated serrations are substantially planar, but it will be understood that the serrations may vary in depth or thickness, in particular having tapered or chamfered edges. The serrations 100 are shown as having a profile substantially corresponding to an isosceles triangle, but it will be understood that other serration shape profiles may be used, e.g. curved or wave-shaped profiles, crenelated edges, etc.

Figure 6:
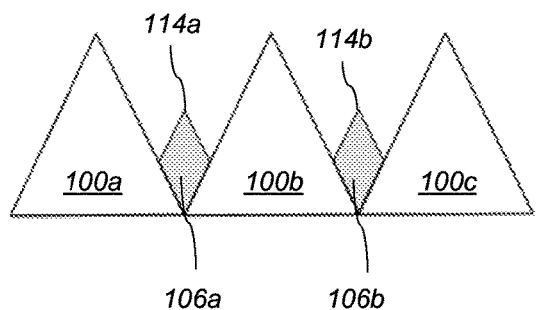
FIG. 6 shows a top view of trailing edge serrations and the splitter plate arrangement of the present invention.

In the embodiment shown in FIG. 6, the serrations 100a, 100b, 100c are provided with splitter plates 106a, 106b, each having a diamond shaped surface. Each of the splitter plates 106a, 106b has an acute angle vertex 114a, 114b extending into said space in between adjacent serrations 100a, 100b, 100c to mitigate noise during operation of the wind turbine with the serrated trailing edge blade.

Figure 7:
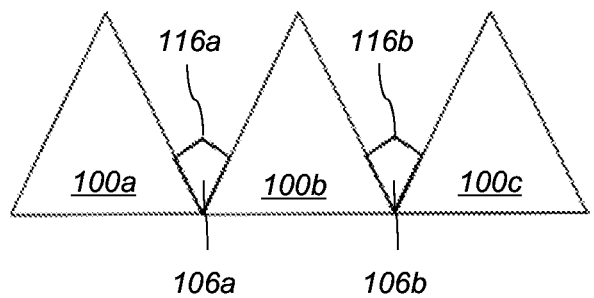
FIG. 7 shows a top view of trailing edge serrations and another embodiment of the splitter plate arrangement of the present invention.

FIG. 7 shows another embodiment of the splitter plate arrangement of the present invention. Here, the serrations 100a, 100b, 100c are provided with splitter plates 106a, 106b, each having a kite shaped surface. Thus, each of the splitter plates 106a, 106b has an obtuse angle vertex 116a, 116b extending into said space in between adjacent serrations 100a, 100b, 100c.

Figure 8:
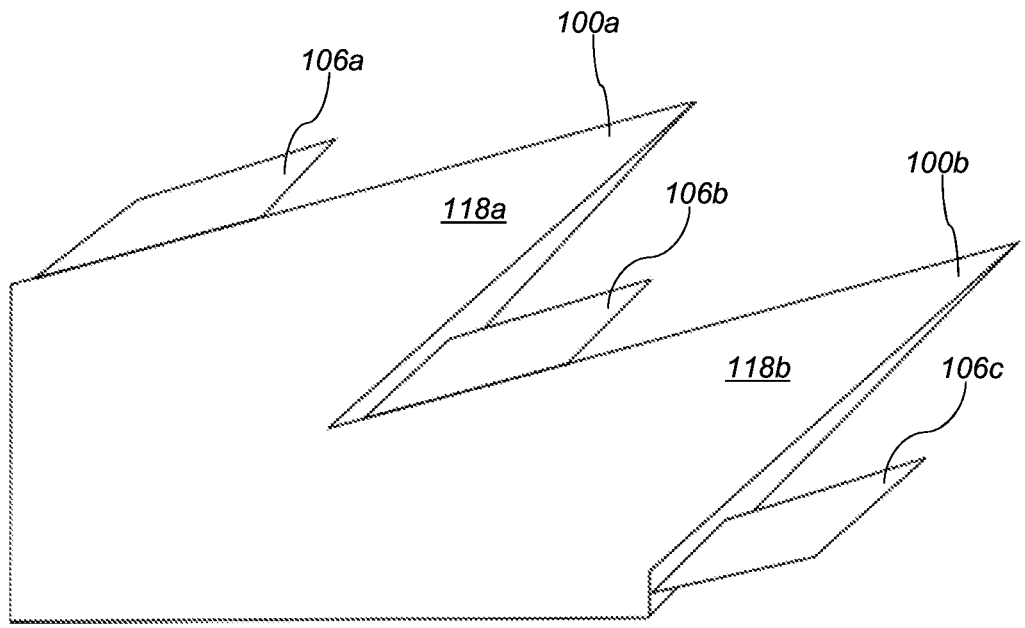
FIG. 8 shows a perspective partial view of trailing edge serrations and the splitter plate arrangement of the present invention.

As is best seen in the perspective drawing of FIG. 8, the serrations 100a, 100b and the splitter plates 106a, 106b, 106c define respective planes which are oriented substantially parallel to each other. Preferably, a splitter plate is arranged between each of two adjacent serrations. The top surfaces 118a, 118b and respective bottom surfaces (not shown) of the serrations taper toward the apex end of the serrations. The plane of the splitter plates 106a, 106b, 106c is oriented at a small angle to the top surface 118a, 118b and to the bottom surface of the serrations, i.e. the respective suction and pressure sides of the serrations, such that the angle between the plane defined by the serration top surface and the plane of the splitter plate equals the angle between the plane defined by the serration bottom surface and the plane of the splitter plate 106a, 106b, 106c.

Figure 9:
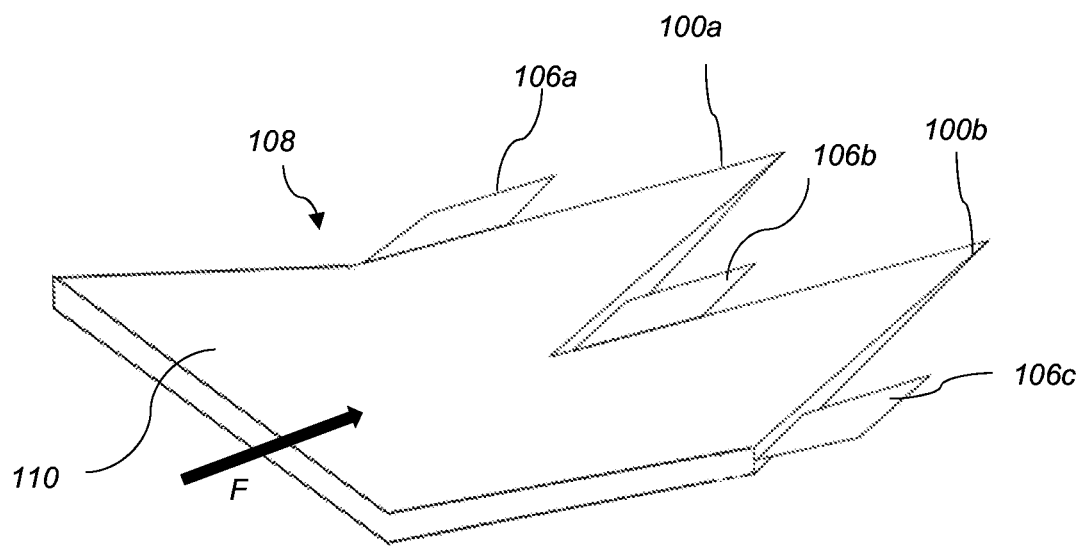
FIG. 9 shows a perspective partial view of trailing edge panel comprising serrations and the splitter plate arrangement of the present invention.

In the embodiment illustrated in FIG. 9, the serrations 100a, 100b and the splitter plates 106a, 106b, 106c are provided as part of a trailing edge panel 108 for attachment to the trailing edge 20 of a wind turbine blade 10. The panel 108 comprises a base section 110 for attachment to the blade 10, with the serrations 100a, 100b arranged at an angle to the base section 110 such that the serrations 100 are arranged at incidence to the air flow over the wind turbine blade 10. The direction of air flow over the wind turbine blade is generally indicated by the arrow F.

While the splitter plates 106 may be formed integrally as part of the serrations 100, e.g. as part of a moulding process, in further aspects the splitter plates 106 may be provided as separate add-on elements which can be attached to serrations 100. The add-ons may be provided as slotted elements which can be slid onto a serration from the end of the serration, and may be secured to the serration using any suitable means, e.g. adhesive bonding and/or a mechanical clip-on or snap-fit connection, based on interlocking elements provided on the serration and the add-ons.

Figure 10:
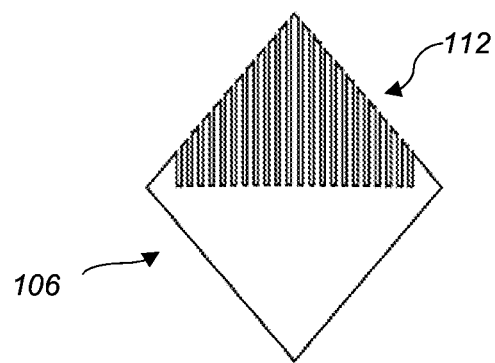
FIG. 10 is a top view of one embodiment of a splitter plate according to the present invention.

The splitter plates of the present invention may comprises one or more slits and/or holes. An example embodiment of this is shown in FIG. 10, in which the splitter plate 106 comprises streamwise comb-like stiff structures 112. This has been found to reduce load on the arrangement during operation.

The invention is not limited to the embodiments described herein, and may be modified or adapted without departing from the scope of the present invention. The shape of the splitter plate may for instance take many different shapes such as a flat or smooth distal part. Further, the splitter plate may be designed with for instance two or three apex points (or smaller serrations) instead of the shown one apex point.

The invention claimed is:

1. A wind turbine blade (10) having a profiled contour including a pressure side and a suction side, and a leading edge (18) and a trailing edge (20) with a chord having a chord length extending therebetween, the wind turbine blade (10) extending in a spanwise between a root end and a tip end, the wind turbine blade comprising a plurality of serrations (100) provided along at least a portion of the trailing edge (20) of the blade (10), wherein the wind turbine blade (10) further comprises one or more splitter plates (106a, 106b), each of the one or more splitter plates being arranged to extend at least partly into a space in between adjacent ones of the serrations (100a, 100b, 100c), wherein each of the one or more splitter plates has a uniform thickness, wherein a thickness of the one or more splitter plates (106a, 106b) is less than a thickness of at least a part of the adjacent ones of the serrations, and wherein the one or more splitter plates (106a, 106b) are arranged between, and are connected to, adjacent ones of the serrations.

2. The wind turbine blade according to claim 1, wherein each of the one or more splitter plates (106a, 106b) are connected between a first sidewall of a first serration and a second sidewall of a second serration.

3. The wind turbine blade according to claim 1, wherein sidewalls of the serrations have a sidewall thickness and a plate thickness of each of the one or more splitter plates (106a, 106b) is less than the sidewall thickness.

4. The wind turbine blade according to claim 3, wherein the ratio of the sidewall thickness and the plate thickness is at least 2:1.

5. The wind turbine blade according to claim 3, wherein the ratio of the sidewall thickness and the plate thickness is at least 5:2.

6. The wind turbine blade according to claim 3, wherein the ratio of the sidewall thickness and the plate thickness is at least 3:1.

7. The wind turbine blade according to claim 1, wherein each of the one or more splitter plates (106a) comprises a vertex extending into said space in between the adjacent ones of the serrations (100a, 100b).

8. The wind turbine blade according to claim 7, wherein the vertex comprises an acute angle vertex (114a).

9. The wind turbine blade according to claim 1, wherein the serrations (100a, 100b, 100c) and the splitter plates (106a, 106b) define respective planes which are oriented substantially parallel to each other.

10. The wind turbine blade according to claim 1, wherein the serrations (100) comprise a base (102) proximal to the trailing edge (20) of the blade (10) and an apex (104) distal to the trailing edge (20) of the blade (10) with a notional line extending from a midpoint of the base (102) to the apex (104) defining a height H of the serrations and wherein the at least one splitter plate extends into a space in between adjacent ones of the serrations to a distance of 60% or less of the height (H) of said trailing edge serrations (100).

11. The wind turbine blade according to claim 10, wherein the at least one splitter plate extends into the space in between adjacent ones of the serrations to a distance of 50% or less of the height (H) of said trailing edge serrations (100).

12. The wind turbine blade according to claim 1, wherein said one or more splitter plates (106*a*, 106*b*) are formed integrally with said serrations (100).

13. The wind turbine blade according to claim 1, wherein said one or more splitter plates (106*a*, 106*b*) are provided as add-on elements arranged to be attached to said serrations (100).

14. The wind turbine blade according to claim 1, wherein said one or more splitter plates (106*a*, 106*b*) are attached to said serrations (100) using adhesive bonding and/or a snap-fit or clip-on interlocking connection.

15. The wind turbine blade according to claim 1, wherein the thickness of each of the one or more splitter plates is 2.0 mm or less.

16. The wind turbine blade according to claim 15, wherein the thickness of each of the one or more splitter plates is 1.5 mm or less.

17. The wind turbine blade according to claim 1, wherein each of the one or more splitter plates (106) comprises a parallelogram shaped surface.

18. The wind turbine blade according to claim 17, wherein each of the one or more splitter plates (106) comprises two opposing parallelogram shaped surfaces.

19. The wind turbine blade according to claim 17, wherein each of the one or more splitter plates (106) comprises two opposing diamond shaped surfaces.

20. The wind turbine blade according to claim 19, wherein an acute angle of each of the diamond shaped surfaces extends into the space between adjacent ones of the serrations (100*a*, 100*b*).

21. The wind turbine blade according to claim 1, wherein each of the one or more splitter plates (106) comprises a kite shaped surface.

22. The wind turbine blade according to claim 21, wherein each of the one or more splitter plates (106) comprises two opposed kite shaped surfaces.

23. The wind turbine blade according to claim 1, wherein each of the one or more splitter plates (106) comprises a triangular shaped surface.

24. The wind turbine blade according to claim 23, wherein each of the one or more splitter plates (106) comprises two opposing triangular shaped surfaces.

25. The wind turbine blade according to claim 1, wherein each of the one or more splitter plates (106) comprises one or more slits.

26. A serrated panel (108) for a wind turbine blade, wherein the serrated panel (108) is arranged to be attached to a trailing edge of a blade to form a plurality of serrations (100*a*, 100*b*) at the trailing edge of the blade,
wherein the serrated panel (108) further comprises one or more splitter plates (106*a*, 106*b*, 106*c*), each of the one or more splitter plates being arranged to extend at least partly into a space in between adjacent serrations (100*a*, 100*b*),
wherein each of the one or more splitter plates has a uniform thickness, wherein a thickness of each of the one or more splitter plates is less than a thickness of at least part of the adjacent serrations (100*a*, 100*b*), and
wherein the one or more splitter plates (106*a*, 106*b*) are arranged between, and are connected to, adjacent ones of the serrations.

* * * * *